United States Patent
Dunstan et al.

(10) Patent No.: US 7,243,249 B1
(45) Date of Patent: Jul. 10, 2007

(54) METHOD AND APPARATUS FOR FACILITATING POWER STATE CONTROL AND AWARENESS OF AN AUTONOMOUS SUBSYSTEM IN A COMPUTER BASED SYSTEM

(75) Inventors: Robert Dunstan, Forest Grove, OR (US); Frank P. Hart, Apex, NC (US); Paul Zurcher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 09/675,617

(22) Filed: Sep. 29, 2000

(51) Int. Cl.
*G06F 1/26* (2006.01)
(52) U.S. Cl. .................. 713/310; 713/323; 713/324
(58) Field of Classification Search ................ 713/300, 713/310, 320, 321, 322, 323, 324, 340; 709/220, 709/222, 223, 224, 253, 237; 370/395.41; 379/114.07
See application file for complete search history.

(56) References Cited

U.S. PATENT DOCUMENTS

| | | | | |
|---|---|---|---|---|
| 4,695,999 A | * | 9/1987 | Lebizay | 370/217 |
| 5,440,556 A | * | 8/1995 | Edem et al. | 370/465 |
| 5,630,144 A | * | 5/1997 | Woog et al. | 713/310 |
| 5,640,573 A | * | 6/1997 | Gephardt et al. | 713/340 |
| 5,809,311 A | * | 9/1998 | Jones | 713/300 |
| 5,819,100 A | * | 10/1998 | Pearce | 713/323 |
| 5,842,027 A | * | 11/1998 | Oprescu et al. | 713/300 |
| 5,884,086 A | * | 3/1999 | Amoni et al. | 713/300 |
| 5,978,922 A | * | 11/1999 | Arai et al. | 713/323 |
| 6,105,142 A | * | 8/2000 | Goff et al. | 713/324 |
| 6,148,345 A | * | 11/2000 | Yamaki | 709/253 |
| 6,446,214 B2 | * | 9/2002 | Chrysanthakopoulos | 713/310 |

FOREIGN PATENT DOCUMENTS

JP      01300742 A  *  12/1989

\* cited by examiner

*Primary Examiner*—Thuan Du
(74) *Attorney, Agent, or Firm*—Guojun Zhou

(57) ABSTRACT

A method and apparatus for facilitating power state control and awareness of an autonomous subsystem in a computer based system without involvement of the main operating system.

12 Claims, 6 Drawing Sheets

METHOD AND APPARATUS FOR FACILITATING POWER STATE CONTROL AND AWARENESS OF AN AUTONOMOUS SUBSYSTEM IN A COMPUTER BASED SYSTEM

FIELD OF THE INVENTION

The present invention pertains to the field of computers. More particularly, the present invention relates to facilitating power state control and awareness of an autonomous subsystem in a computer based system.

BACKGROUND OF THE INVENTION

Computer based systems are becoming more mobile. This mobility often places an emphasis on usability. Usability is often extended by the ability to operate the equipment for longer periods of time. This time period is often related to the power consumption of the equipment, particularly in battery operated equipment. Thus, high power consumption may pose problems.

Numerous approaches to reducing power consumption have been tried. Powering off equipment when not in active use is one approach. Other approaches involve putting equipment in various lower power states, such as, idle mode, sleep mode, hibernation mode, etc. Such approaches may involve turning off portions of circuits or components, powering down subsystems and/or the main system, lowering supply voltages, altering clocking mechanisms, transferring data from, for example, random access memory (RAM) to disk storage, etc.

The powering up and down of subsystems without some form of communication between the subsystems or coordination may result in power cycling when not needed. This uncoordinated powering up and down may result in unneeded and unnecessary power consumption and present a problem for battery operated equipment.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for facilitating power state control and awareness of an autonomous subsystem in a computer based system are described. For purposes of discussing the invention, it is to be understood that various terms are used by those knowledgeable in the art to describe energy control and awareness. Reference is made to subsystems, but it is understood that such references are with respect to an energy control or awareness device. That is, from the point of view of a energy controller, for example, a main processor, a hard disk drive, and a communications subsystem all are considered subsystems. They are all subsystems with respect to the energy control system. An autonomous subsystem is understood to be a subsystem that does not require the use of a computer operating system to coordinate and/or control all aspects of the subsystem operation. Thus, an autonomous subsystem with respect to energy control, does not need an operating system to effect the energy control mechanisms described in the present invention. That is, an autonomous subsystem for energy control purposes exists independently, and without outside control of an operating system may respond and/or react on its own.

The terms energy control or energy controller and power control or power controller are to be understood to refer to the same controlling mechanism. While energy is understood to be related to the integral over time of power, for purposes of the present invention and the discussion, they are to be understood as interrelated and interchangeable as relating to controlling a device such that power or total energy is controlled. Likewise, the power state or energy state of a system or device may have a continuum of ranges. For example, power states may be, but are not limited to, full on, full wakeup, limited wakeup, light sleep, deep sleep, hibernation, full off, etc. Additionally, the power state may be achieved by a variety of mechanisms, such as, but not limited to, reduced current, reduced voltage, reduced frequency of operation, powering off sections of circuits or subsystems, etc. Also, it is to be understood that an energy controller or power controller may be implemented in a variety of ways. For example, an energy controller may, but is not limited to, implementation by use of an embedded controller. That is, the embedded controller may control various mechanisms as noted above to effect the energy control.

A machine-readable medium is understood to include any mechanism for storing information in a form readable by a machine (e.g., a computer) such as read only memory (ROM); random access memory (RAM); magnetic disk storage media; optical storage media; flash memory devices; electrical, optical, acoustical; as well as for transmitting information in a form of propagated signals such as carrier waves, infrared signals, digital signals, etc.

Figure 1:
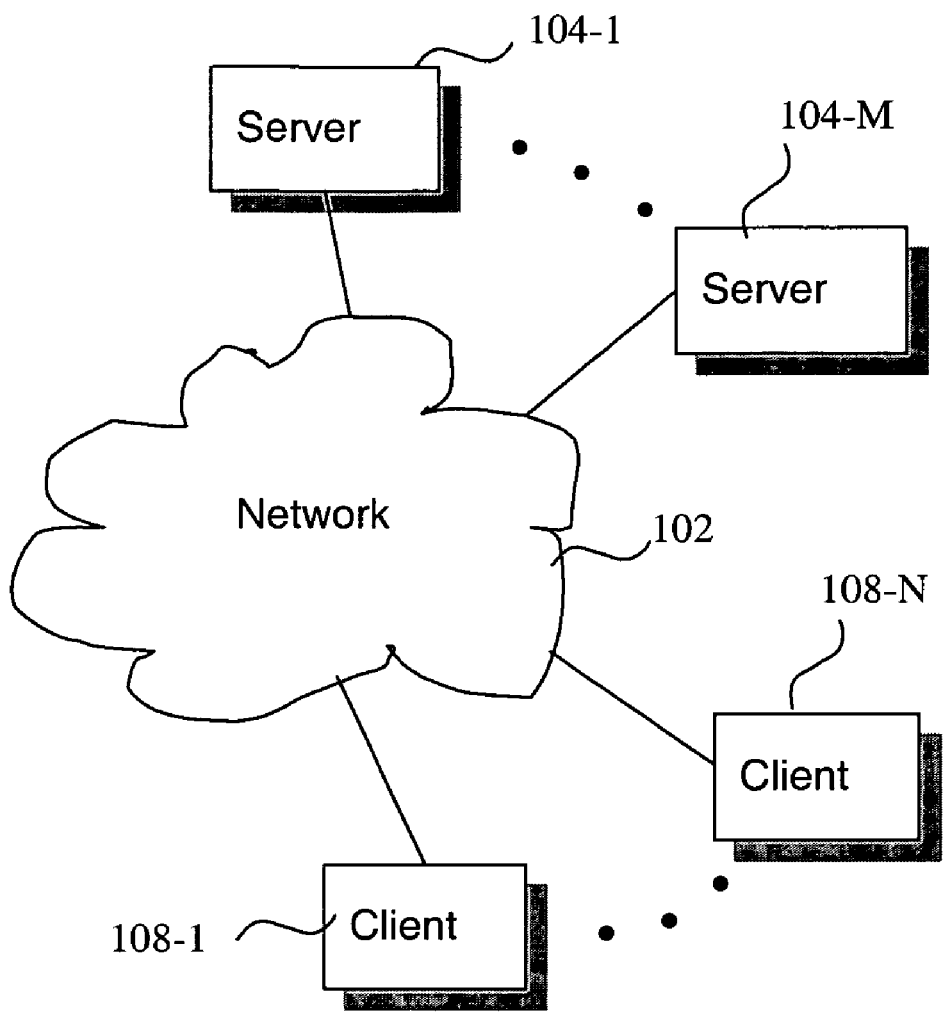
FIG. 1 illustrates a networked computer environment.

FIG. 1 illustrates a network environment in which the techniques described may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
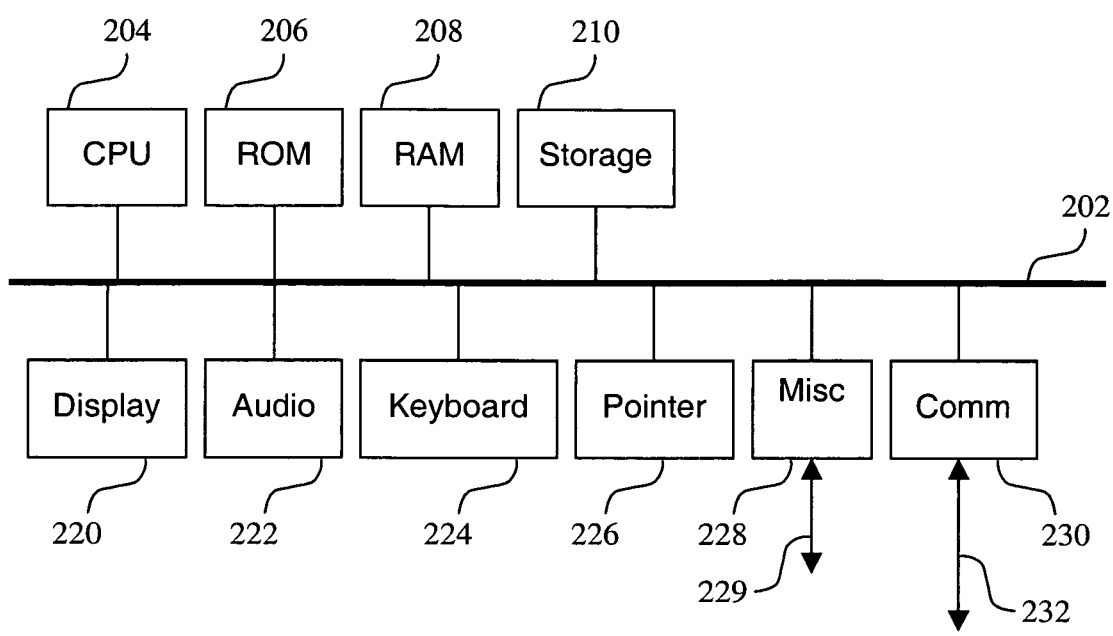
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks, optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

In FIG. 1, the client 108-1 may be running a power controlling program or sequence that has the capability to access the network. This capability would allow power control or updates thereto from a server via the Internet and/or other network. A description of the method of updating or installation of any revised power control code and/or data is not necessary for an understanding of the present invention.

The power control functionality and information required for controlling a device, such as a subsystem, in the present invention may, but is not limited to, embodiment in the CPU 204, the Storage 210, the Display 220, the Communications device 230, etc. This power control information may consist of, but is not limited to, subsystem indicators, preferential modes of operation, power control states, power status messages, etc. Additionally, accesses through, for example, the Communications device 230 which might be, for example, an Ethernet adapter would allow access to a network wherein the information such as a subsystem power indicators and/or preferred modes of operation information may be retrieved.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may, for example, have a subsystem that needs to power up independently of the main system upon receiving a message.

Figure 3:
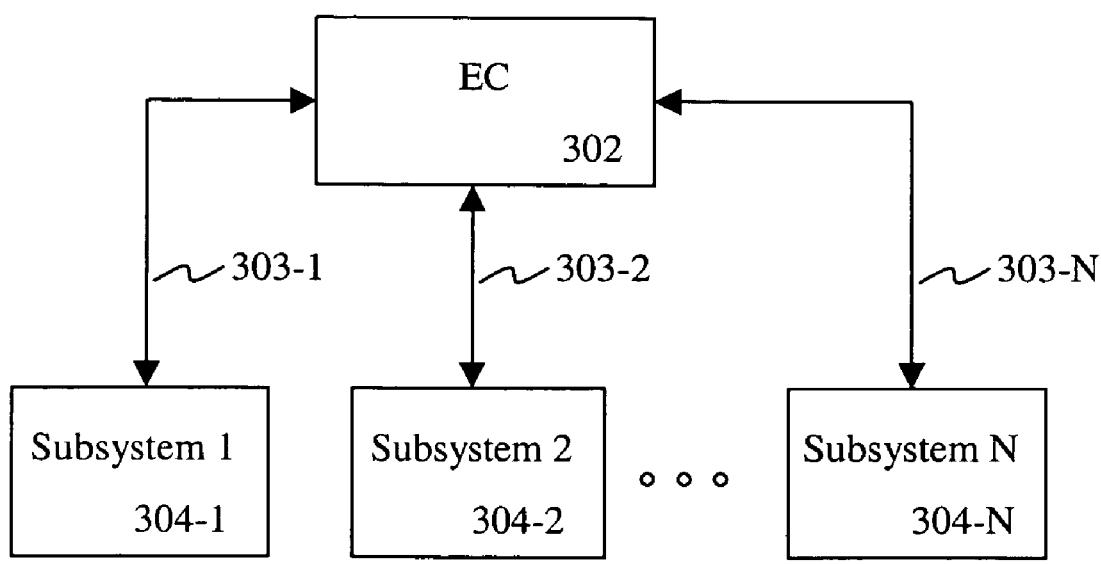
FIGS. 3, and 4 are block diagrams illustrating various embodiments of the present invention.

FIG. 3 is a high level block diagram of one embodiment of the present invention. An energy controller (EC) 302 is connected through dedicated communications links 303-1 through 303-N to respective subsystems 1 through N (304-1 through 304-N). The communications links 303-1 through 303-N may be used for, but are not limited to, communicating information and/or status, power or energy control, configuration of a subsystem, etc.

Figure 4:
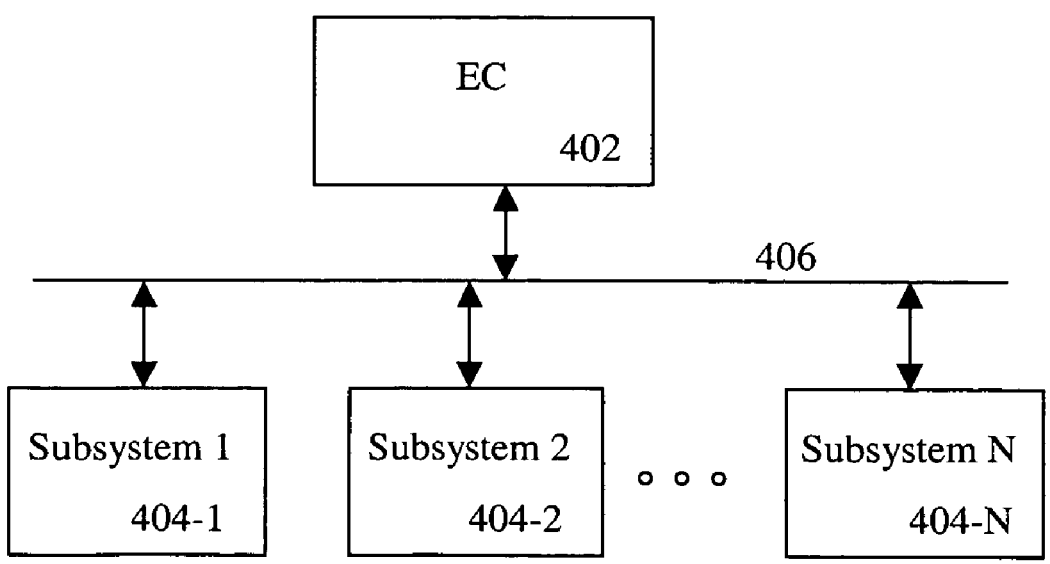

FIG. 4 is a high level block diagram of another embodiment of the present invention. An energy controller (EC) 402 is connected through a shared communications link 406 to subsystems 1 through N (404-1 through 404-N). The communications link 406 may be used for, but is not limited to, communicating information and/or status, power or energy control, configuration of a subsystem, etc. In such a shared communications link architecture, each subsystem (1 through N), may be individually addressable. In this manner the EC 402 may communicated individually with a particular subsystem. Additionally, the subsystems may be communicated to as a group. For example, subsystem 1 through 10, may be communicated to while other subsystems are not communicated with. Depending upon the communication from the EC 402, it may be that all subsystems will respond. For example, the EC 402 may issue a general message for each of the subsystems to start their shut down procedure.

Figure 5:
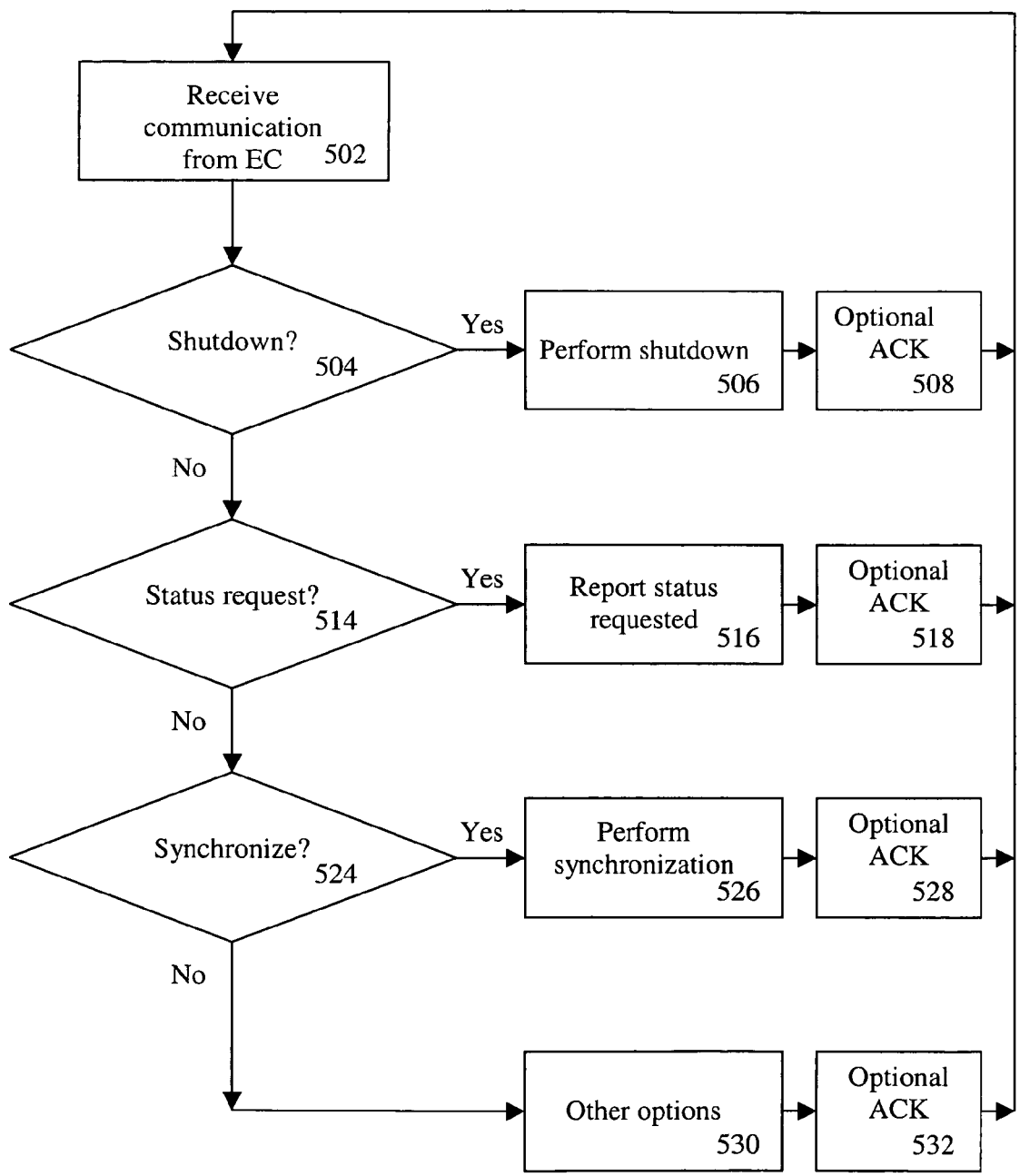
FIGS. 5, and 6 are flow diagrams illustrating various embodiments of the invention.

FIG. 5 is a more detailed flow diagram of an embodiment of the present invention. It is to be understood that FIG. 5 represents a per subsystem flow diagram rather than an overall flow diagram for an entire system having multiple subsystems. A particular subsystem receives a communication from the EC 502. The received communication from the EC 502 is checked to see if it is a communication for a shutdown 504. If the communication is for a shutdown the subsystem will perform the shutdown 506, optionally send an acknowledgement (ACK) 508 to the EC, and then return to waiting to receive a communication from the EC 502. If the communication is not for a shutdown, then the received communication from EC 502 is checked to see if it is a communication for a status request 514. If the communication is for a status request the subsystem will report status requested 516, optionally send an acknowledgement 518 to the EC, and then return to waiting to receive a communication from the EC 502. If the communication is not for a status request, then the received communication from EC 502 is checked to see if it is a communication to synchronize 524. If the communication is to synchronize, the subsystem will perform the synchronization 526, optionally send an acknowledgement 528 to the EC, and then return to waiting to receive a communication from the EC 502. If the communication is not a request to synchronize, then other options 530 for processing the request may be done. After these other options 530 are performed the subsystem may optionally send an acknowledgement 532 to the EC, and then return to waiting to receive a communication from the EC 502.

A communication from the energy controller to shutdown may, but is not limited to, completely shutting down, partially shutting down, operating on a different voltage, operating at a different frequency, etc. A status request may be for such information as the current operating mode, power efficiency, anticipated power demand, operating options, etc. A request to synchronize may be, for example, for a memory subsystem to synchronize its data with that of a storage subsystem. For example, prior to issuing a shutdown communication to a memory subsystem, the EC may issue a synchronize communication so that any data that may be lost in a volatile memory when shutdown is stored to a nonvolatile device. Other options 530 may be, but are not limited to, communications requesting a full wakeup of the subsystem, a limited wakeup, a command to resume a previous state, etc.

The optional acknowledgement (ACK) 508, 518, 528, and 532 to the EC 502 may be used for a variety of purposes. In one embodiment, the ACK may simply be an indication that the respective communication was received. In another embodiment, the ACK may indicate that the communication was received and an operation specified in the communication was performed. In yet another embodiment, the lack of receipt of an ACK may cause the EC 502 to perform a hardware reset operation on the non-acknowledging subsystem. One skilled in the art will appreciate that many variations and combinations are possible.

Figure 6:
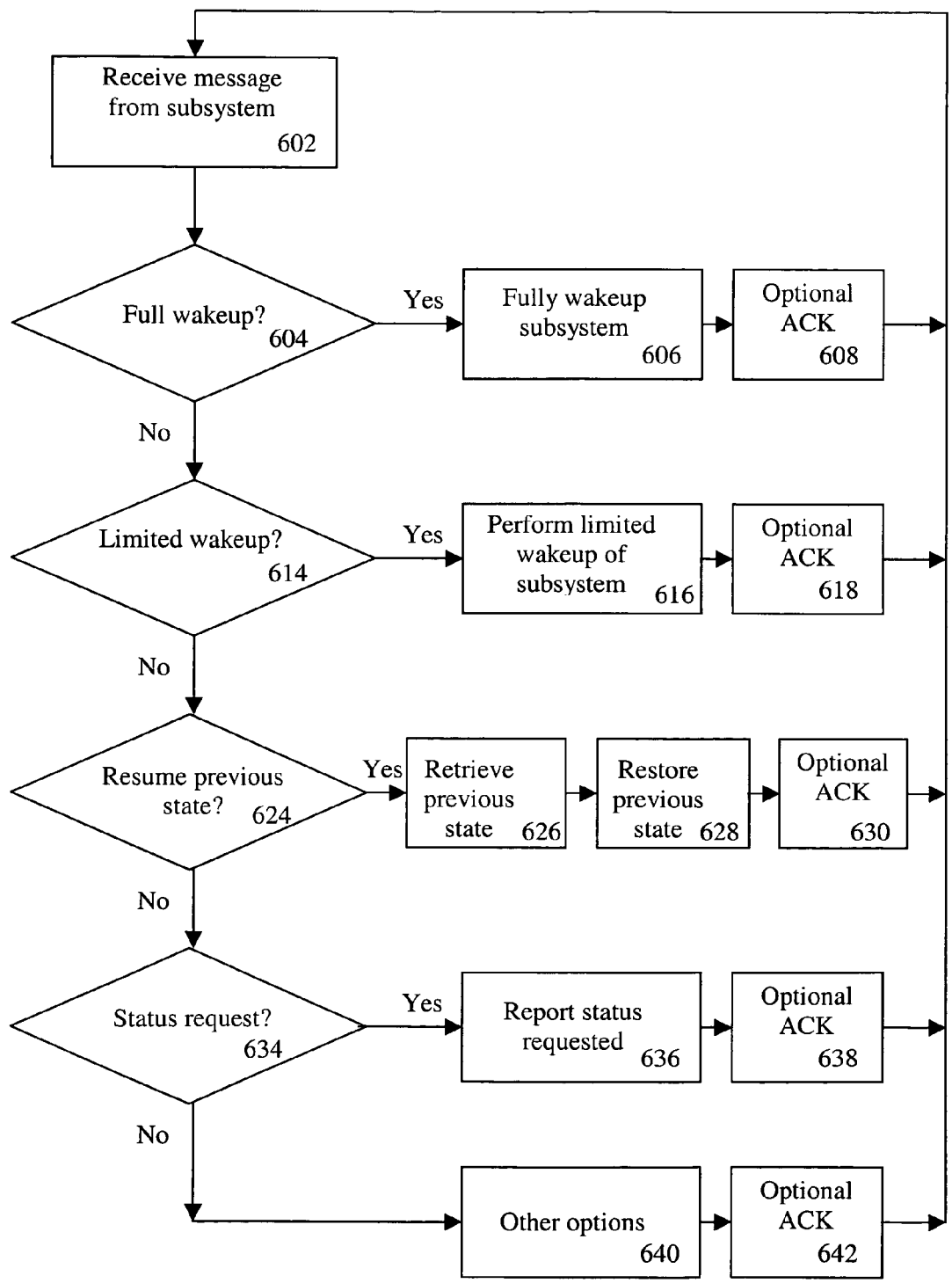

FIG. 6 is a more detailed flow diagram of an embodiment of the present invention. It is to be understood that FIG. 6 represents a per energy controller flow diagram. That is, a system or device may have multiple energy controllers, however for illustrative purposes FIG. 6 assumes a single EC and multiple subsystems. The EC receives a communication from a subsystem 602. The received communication from the subsystem 602 is checked to see if it is a communication from a subsystem requesting a full wakeup 604. If the communication is for a full wakeup of the subsystem then the EC will fully wakeup the subsystem 606, will optionally send an acknowledgement (ACK) 608 to the subsystem, and then return to waiting to receive a communication from any subsystem 602. If the communication is not for a full wakeup, then the received communication from a subsystem 602 is checked to see if it is a communication for a limited wakeup 614. If the communication is for a limited wakeup of a subsystem then the EC will perform a limited wakeup of the subsystem 616, optionally send an acknowledgement 618 to the subsystem, and then return to waiting to receive a communication from any subsystem 602. If the communication is not for a limited wakeup 614, then the received communication from the subsystem 602 is checked to see if it is a communication to resume a previous state 624. If the communication is to resume a previous state, the previous state is retrieved 626, the previous state is restored 628 to the subsystem, an optional acknowledgement 630 may be sent to the subsystem, and then the EC returns to waiting to receive a communication from any subsystem 602. If the communication is not to resume a previous state, then other options 640 may be done. After these other options 640 are performed the EC may optionally send an acknowledgement 642 to the subsystem on whose behalf the actions were instigated, and then return to waiting to receive a communication from any subsystem 602.

A communication from the energy controller to fully wakeup or a limited wakeup of a subsystem may, but is not limited to, completely powering up the system, fully powering up parts of the subsystem, setting operating voltage levels, setting subsystem operating frequencies, etc. Resuming a previous state 624, is a request by a subsystem to be placed back to where is was previously. This request from a subsystem may be required for example after an interrupt, other processing, or communications from the EC places the subsystem in a state is not optimal for processing purposes. For example, a memory subsystem after being shutdown may need to be restored to the state it was in prior to the shutdown in order to provide useful information. A status request may be for such information as the subsystem's controlling EC's current operating mode, power efficiency, anticipated power or battery life, operating options, etc. Other options 640 may be, but are not limited to, communications requesting a shutdown, a request to synchronize, etc.

Figure 7:
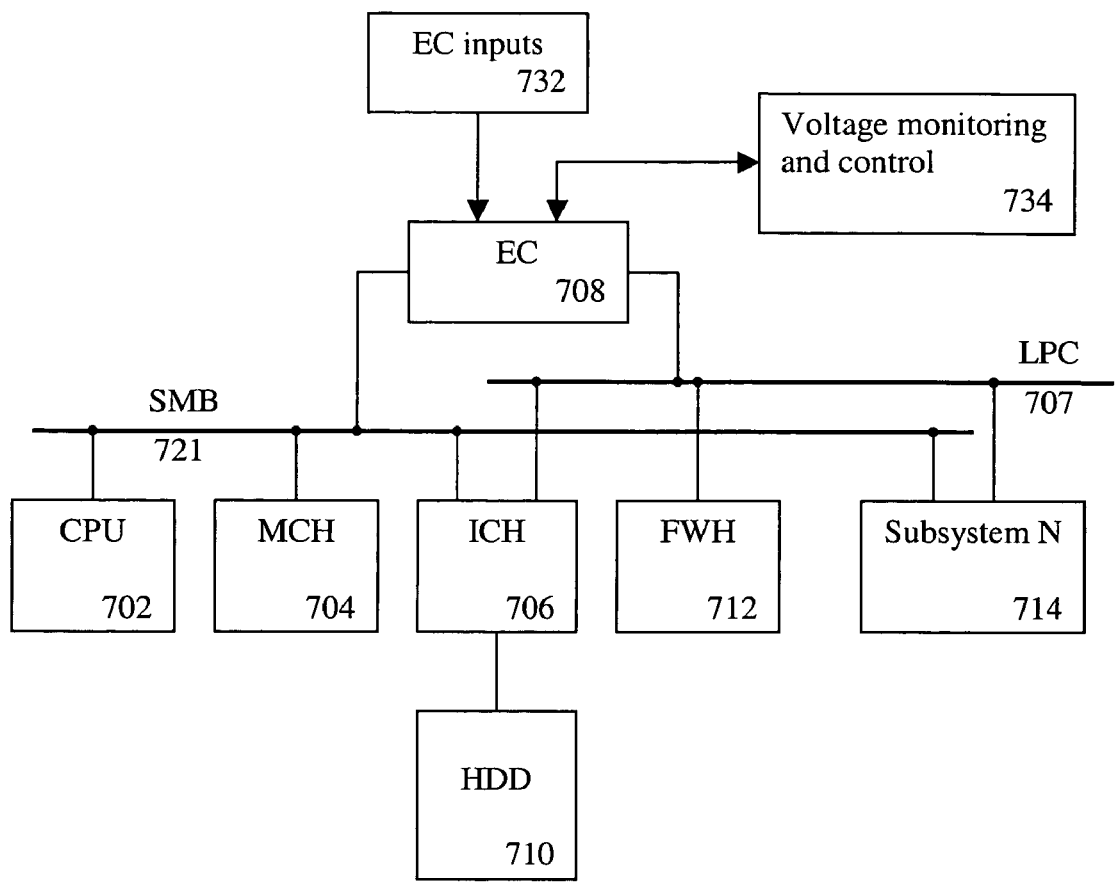
FIG. 7 is a block diagram illustrating an embodiment of the present invention.

FIG. 7 illustrates a possible system architecture for embodiment of the present invention. An energy controller (EC) 708 is coupled to a system management bus (SMB) 721. Also coupled to the SMB 721 is a central processing unit (CPU) 702, a memory controller hub (MCH) 704, an input/output controller hub (ICH) 706, a firmware hub (FWH) 712, and a representative autonomous subsystem N 714. The ICH 706 is also coupled to a hard disk drive (HDD) 710. The EC 708 is also coupled to EC inputs 732, and voltage monitoring and control 734. Through a second bus, a low pin count (LPC) bus 707, the EC 708 is also coupled to the ICH 706, the FWH 712, and the subsystem N 714.

EC inputs 732, may be, but are not limited to, such inputs as: a reset button, for example on a computer; a signal from another system; a battery pack indicator; a power down button; a hibernation signal; a limited mode of operation signal; an on-off switch, etc. It is to be understood that an on-off switch in a system does not imply that in the off position that the system draws no power, or that in the on position that the system is at full power. Rather a system may have a continuum of power ranges for operation and the on-off switch may serve only as an indicator of what power range the user perceives the system should be in. For example, a user may have many programs running on a system and, for example, after finishing and saving a document, may power down the system and place the on-off switch in the off position. However, depending upon prior preferences and/or applications running the system may still be active, for example, after turning off the computer the user may still want it to be able to receive wireless communications, such as incoming email.

Voltage monitoring and control 734, may be, but are not limited to, such signals as: energy reserve; a battery pack indicator; an external power pack or charger; voltage levels; a battery removed signal; a shutdown signal; a temperature indicator, etc. Voltage monitoring and control 734 is to be understood to deal with the energy source for the system. For portable systems, this will most likely be a battery pack and so the signals will be relevant to energy reserves, charging, voltage, current, temperature, etc.

A possible sequence of events will serve to illustrate some of the possible features of the present invention within the architecture of FIG. 7. Upon the initial powering up of the system as illustrated in FIG. 7, the EC 708 receives an EC input 732, from for example, a power reset circuit. EC 708 may then communicate with the voltage monitoring and control 734 to establish when power is stable. EC 708 may then issue a communication for subsystem N 714 to shutdown. Some time later, perhaps due to a wireless communication coming into subsystem N 714, subsystem N 714 may communicate to EC 708 a request for a limited wakeup so that subsystem N 714 can determine if the wireless communication is intended for it and should be received and stored. EC 708 may then perform a limited wakeup of subsystem N 714. If subsystem N 714 determines that the communication is not intended for it, then subsystem N 714 may communicate to EC 708 a request to be shutdown. On the other hand, if the communication is to be received and stored, subsystem N 714 may request from EC 708 a full wakeup. After reception and storage of the information received from the wireless communication within subsystem N 714, subsystem N 714 may then request a shutdown. Some time later, EC 708 may determine from the voltage monitoring and control 734 that, for example, battery life is waning and a system-wide shutdown is needed. At this point EC 708 may issue a status request to subsystem N 714 and from that determine that data in volatile memory within subsystem N 714 needs to be saved. EC 708 may then communicate to subsystem N 714 to synchronize data with, for example, the HDD 710 and subsystem N 714 may acknowledge receipt of this request The subsystem N 714, if it needs to be fully awake to effect this synchronization and is not fully awake, would request from EC 708 to be fully awoken. Upon being fully awake subsystem N 714, may then communicate to the HDD 710 through the ICH 706 when both these subsystems are in a power state allowing for the transfer and storage of information. After this sequence, subsystem N 714 may acknowledge the synchronization and then the EC 708 may communicate to the subsystem N 714 to shutdown. The communications between subsystems, such as ICH 706, HDD 710, FWH 712, subsystem N 714, etc., and the EC 708 may be effected via the SMB 721. Additionally, subsystems may communicate with each other via the SMB 721. Note that all the above transactions have occurred without the need for an operating system. Additionally, one skilled in the art will recognize that many other architectures, variations, and sequences are possible.

The illustrated embodiments of the present invention are to be understood as applicable to a plurality of subsystems within a single and/or distributed system or systems. For example, in a single system, there may be a subsystem handling user input, from for example, a keyboard, while at the same time another subsystem is handling, for example, the transmission and reception of data via a wireless link. In the quest to conserve power these various subsystems may be in differing stages of power control, for example, they may be powering on and then powering down asynchronously and doing this possibly thousands of times per second. For example, a keyboard subsystem may power up only when a key is being activated and may power down between keystrokes. Similarly, a communications subsystem may be in a limited wakeup mode for reception of data and need to be fully awake only for transmitting information.

The energy controller (EC) may be embodied in various forms as hardware, software, or a combination of these. Additionally the functionality of the EC may also adhere to industry standards. Thus, one such embodiment of the EC may, for example, be an embedded controller whose operation is also compliant with the Advanced Configuration and Power Interface Specification (ACPI, Revision 2, published Jul. 27, 2000). It is to be understood that compliance with an industry standard, which may require the use of an operating system (OS) does not in any way prevent or preclude the functionality of the present invention in an embodiment for use in or by an autonomous subsystem in a system which may or may not require the use of an operating system.

Thus, a method and apparatus for facilitating power state control and awareness of an autonomous subsystem in a computer based system without involvement of a main operating system, such as Unix®, Windows®, Linux®, etc., have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for controlling a power state of an autonomous subsystem without involvement of a main operating system, comprising:
    receiving a first message from the autonomous subsystem, wherein the first message is one of a full wakeup, a limited wakeup, a status request, or a resume previous state;
    sending a second message addressed to the autonomous subsystem, wherein the second message is based on the first message; and
    setting the power state of the autonomous subsystem based on the first message, wherein the power state is set to one of fully waking up the subsystem when the first message is the full wake up message, partially waking up the subsystem when the first message is the limited wakeup message, reporting the status to the subsystem when the first message is the status request, or retrieving and restoring the previous state of the subsystem when the first message is the resume previous state message.

2. The method of claim 1, wherein the second message is one of an acknowledge message, a shutdown message, a status request message, a synchronization message, or a status message.

3. The method of claim 1, wherein the autonomous subsystem is one of a memory, a storage device, a display, an audio device, an input device, or a communication device.

4. The method according to claim 1, wherein the status message includes status information related to operating mode, power efficiency, anticipated power, anticipated battery life, or operation options.

5. A machine-readable medium having stored thereon instructions for controlling a power state of an autonomous subsystem without involvement of a main operating system, which when executed by a processor, causes said processor to perform the following:
    receiving a first message from the autonomous subsystem, wherein the first message is one of a full wakeup, a limited wakeup, a status request, or a resume previous state;
    sending a second message addressed to the autonomous subsystem, wherein the second message is based on the first message; and
    setting the power state of the autonomous subsystem based on the first message, wherein the power state is set to one of fully waking up the subsystem when the first message is the full wake up message, partially waking up the subsystem when the first message is the limited wakeup message, reporting the status to the subsystem when the first message is the status request, or retrieving and restoring the previous state of the subsystem when the first message is the resume previous state message.

6. The machine-readable medium of claim 5, wherein the second message is one of an acknowledge message, a shutdown message, a status request message, a synchronization message, or a status message.

7. The machine-readable medium of claim 5, wherein the autonomous subsystem is one of a memory, a storage device, a display, an audio device, an input device, or a communication device.

8. The machine-readable medium of claim 5, wherein the status message includes status information related to operating mode, power efficiency, anticipated power, anticipated battery life, or operation options.

9. A system for controlling a power state of an autonomous subsystem without involvement of a main operating system, comprising:
  a power state controller having an input port, an output port, and a communications channel;
  a user input coupled to the power state controller input port;
  an energy monitor signal coupled to the power state controller input port; and
  an autonomous subsystem coupled to the power state controller output port and the power state controller communications channel,
  wherein the power state controller is to i) receive a first message from the autonomous subsystem, where the first message is one of a full wakeup, a limited wakeup, a status request, or a resume previous state, ii) send a second message to the autonomous subsystem based on information including the first message, iii) set the power state of the autonomous subsystem based on the first message, wherein the power state is set to one of fully waking up the subsystem when the first message is the full wake up message, partially waking up the subsystem when the first message is the limited wakeup message, reporting the status to the subsystem when the first message is the status request, or retrieving and restoring the previous state of the subsystem when the first message is the resume previous state message.

10. The system of claim 9, wherein the user input includes a switch to turn the system on and off.

11. The system of claim 9, wherein the energy monitor signal includes a signal indicative of remaining battery capacity, a voltage level, a temperature indicator, a system signal and a current level remaining battery capacity.

12. The system of claim 9, wherein the status message includes status information related to operating mode, power efficiency, anticipated power, anticipated battery life, or operation options.

* * * * *